US 8,525,974 B2

(12) United States Patent
Turner et al.

(10) Patent No.: US 8,525,974 B2
(45) Date of Patent: *Sep. 3, 2013

(54) OMNI-DIRECTIONAL IMAGING SENSOR

(75) Inventors: Mark A. Turner, Arlington, TX (US); Brett A. Williams, Iowa City, IA (US)

(73) Assignee: Lockheed Martin Corporation, Grand Prairie, TX (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/932,113

(22) Filed: Feb. 17, 2011

(65) Prior Publication Data

US 2012/0218539 A1    Aug. 30, 2012

Related U.S. Application Data

(63) Continuation of application No. 11/616,614, filed on Dec. 27, 2006, now Pat. No. 7,894,042.

(60) Provisional application No. 60/759,939, filed on Jan. 18, 2006.

(51) Int. Cl.
*G01C 3/08* (2006.01)

(52) U.S. Cl.
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 3,661,464 | A |   | 5/1972  | Hubbard et al. |
| 4,309,758 | A | * | 1/1982  | Halsall et al. .................... 701/23 |
| 4,700,301 | A |   | 10/1987 | Dyke |
| 5,515,054 | A |   | 5/1996  | Radford et al. |
| 2002/0024331 | A1 | | 2/2002  | Lewis et al. |
| 2003/0137669 | A1 | | 7/2003  | Rollins et al. |
| 2004/0252288 | A1 | | 12/2004 | Kacyra et al. |
| 2005/0052656 | A1 | | 3/2005  | Lindner et al. |
| 2005/0088644 | A1 | | 4/2005  | Morcom |
| 2006/0038977 | A1 | | 2/2006  | Williams et al. |

\* cited by examiner

*Primary Examiner* — Luke Ratcliffe

(74) *Attorney, Agent, or Firm* — Withrow & Terranova, PLLC

(57) ABSTRACT

A method comprises generating a laser signal; scanning the laser signal into a field of view; and processing the return signal.

20 Claims, 9 Drawing Sheets

OMNI-DIRECTIONAL IMAGING SENSOR

The earlier effective filing date of U.S. Provisional Application No. 60/759,939, entitled "OMNI-DIRECTIONAL IMAGING SENSOR", and filed Jan. 18, 2006, in the name of the inventors Brett A. Williams and Mark A. Turner, and commonly assigned herewith, is hereby claimed. This provisional application is hereby incorporated by reference for all purposes as if expressly set forth verbatim herein.

This is a continuation of co-pending U.S. application Ser. No. 11/616,614, entitled, "Omni-Directional Imaging Sensor", filed Jan. 27, 2006, in the name of the inventors Brett A. Williams and Mark A. Turner ("the '614 application"), for which the earlier effective filing date is claimed under 35 U.S.C. §120. The '614 application is hereby incorporated by reference for all purposes as if expressly set forth herein verbatim.

BACKGROUND OF THE INVENTION

1. Field of the Invention

The present invention pertains to remote sensing through three-dimensional imagery and, more particularly, to three-dimensional remote sensing from a flying platform.

2. Description of the Related Art

A significant need in many contexts is to locate and determine the position of things relative to some point. For instance, in a military context, it may be desirable to determine the position, or to locate an object relative to a reconnaissance or weapons system so that the object may be targeted. For instance, radio detection and ranging ("RADAR") systems are popularly known for use in remotely sensing the relative position of incoming enemy aircraft. RADAR uses radio frequency ("RF") electromagnetic waves to detect and locate objects at great distances even in bad weather or in total darkness. More particularly, a RADAR system broadcasts RF waves into a field of view ("FOV"), and objects in the FOV reflect RF waves back to the RADAR system. The characteristics of the reflected waves (i.e., amplitude, phase, etc.) can then be interpreted to determine the position of the object that reflected the RF wave.

Some RADAR systems employ a technique known as "Doppler beam sharpening" ("DBS"). DBS uses the motion of an airborne RADAR to induce different Doppler shifted reflections from different cells on the ground. For a fixed range the cells have different Doppler frequencies because each is at a different angle relative to the source of the RADAR wave. This angle comprises depression and azimuth components in rectangular coordinates or, in polar coordinates a "look angle." Thus, projections of the RADAR's velocity on each cell differ, thereby allowing for discrimination of each from the other. Azimuth resolution comes from the Doppler frequency, while range is retrieved from travel time. Azimuth resolution is related to Doppler filter bandwidth which is inversely related to the integration time of that filter—the aperture time.

However, DBS RADAR systems have range dependent resolution and a blind zone dead ahead of the DBS RADAR's motion. The blind zone results because, ahead of the platform, there are insufficient differences in the Doppler shift generated by the cells for the DBS RADAR system to distinguish them. More technically, DBS RADARs have problems pulling cells out of fields of view directly ahead of flight because, for a given resolution, any separation between adjacent iso-Doppler curves becomes too narrow. That is, the iso-Doppler contours get too close together for a fixed resolution and to resolve them requires ever-narrower filters compared to broadside ground-cells.

Reflections present what are known as "Doppler ambiguities" in the field of view where the field of view encompasses both sides of the boresight. The ambiguities arise because cells close to the boresight and the same distance off the boresight will have the same Doppler returns. That is, returns from cells equidistant from the boresight are indistinguishable. This causes ambiguities during processing because it cannot be determined from which side of the boresight a return came.

LADARs with both a transmitter and receiver, or SALs (semi-active laser seeker) with only a receiver, encounter problems that arise from the fact that they use traditional optical technology. For instance, airborne LADAR and SAL systems generally require round, hemispherical radomes, which generate high drag, decreasing aerodynamic performance. Such platforms also typically locate the relatively soft optics for the platform in the central body region of the platform, leading to low lethality, consuming space otherwise available to a radar antenna, actuator, motor or thrusters.

The present invention is directed to resolving, or at least reducing, one or all of the problems mentioned above.

SUMMARY OF THE INVENTION

A method comprises generating a laser signal; scanning the laser signal into a field of view; and processing the return signal.

BRIEF DESCRIPTION OF THE DRAWINGS

The invention may be understood by reference to the following description taken in conjunction with the accompanying drawings, in which like reference numerals identify like elements, and in which.

Figure 1A:
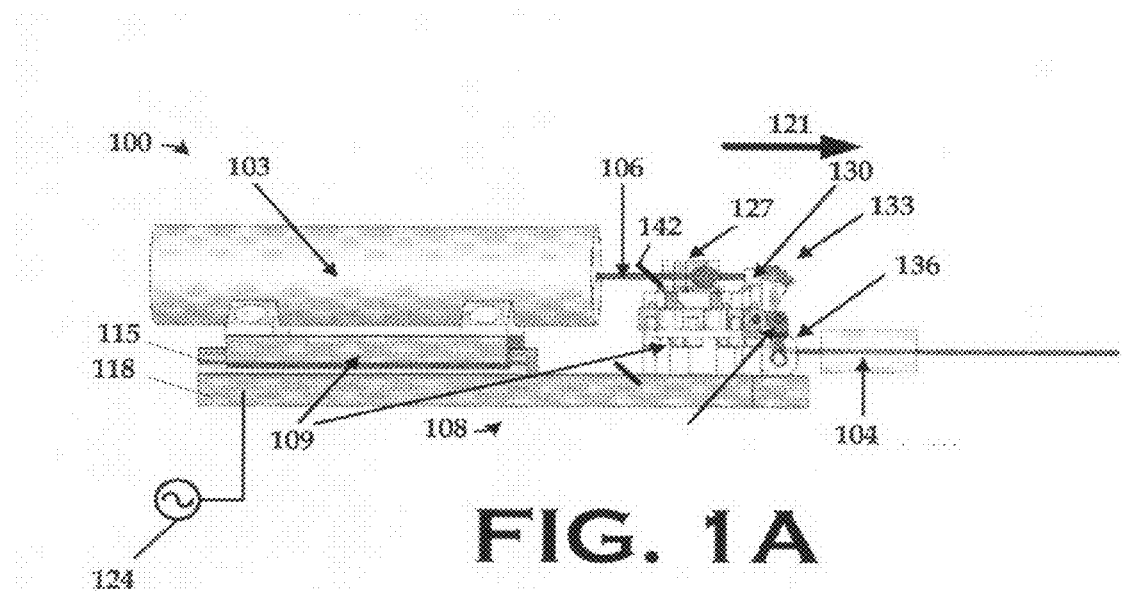
FIG. 1A-FIG. 1B illustrate a variable-beamwidth angle encoding laser scanner ("VAL") transmitter in accordance with one particular embodiment of the present invention in side and perspective views, respectively.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention includes, in its various aspects and embodiments, an Omni-Directional Imaging Sensor ("ODIS"). Some optical imaging sensors use focal plane arrays ("FPA") typically with high aerodynamic-drag hemispherical dome optics. Other radar imaging systems use swept antenna patterns with Doppler beam sharpening ("DBS"). Still other radar imaging systems synthesize large antenna apertures using synthetic aperture radar ("SAR"). However, the present invention performs optical imaging through sleek, low drag, high speed radome surfaces with only one phase-sensitive optical channel and one photomixer equivalent to a single pixel (not many pixels as in an FPA) from which an image of the ground is built. Contrary to the blind zone of DBS, ODIS has no forward blind zone. Since SAR requires imaging to the side of platform motion, and DBS suffers from a forward blind zone, both SAR and DBS require trajectory shaping for missile interceptors while ODIS does not. This permits direct-to-target guidance.

The unique processing of ODIS is enabled by the performance characteristics of an on-board laser transmitter scanner, the variable-beamwidth angle encoding laser scanner ("VAL"). The unique signal processing of ODIS is a form of linear-frequency-modulation ("LFM"). This signal processing varies depending on receiver architecture after the receiver photomixer.

Two embodiments are presented. While both architectures employ coherent heterodyne detection on the photomixer surface, one embodiment employs architecture that supports a coherent process while in another embodiment that architecture supports a non-coherent process. Both embodiments provide for stationary platform imaging and platforms in motion, where moving platforms generate Doppler frequency shifts added to reflected return signals from ground cells illuminated by the transmitter. However, while standard radar employs LFM over the length of a pulse, that is, in one dimension "along" the line of sight, ODIS employees LFM over the span of an azimuth sweep in one dimension "across" the line of sight. Note that some alternative embodiments may employ the present invention in only one or the other of the two modes, or in some additional mode not disclosed. Thus, some embodiments might experience some hardwire modification, e.g., to streamline the apparatus by eliminating some parts applicable only to the mode that is not being used.

Figure 1B:
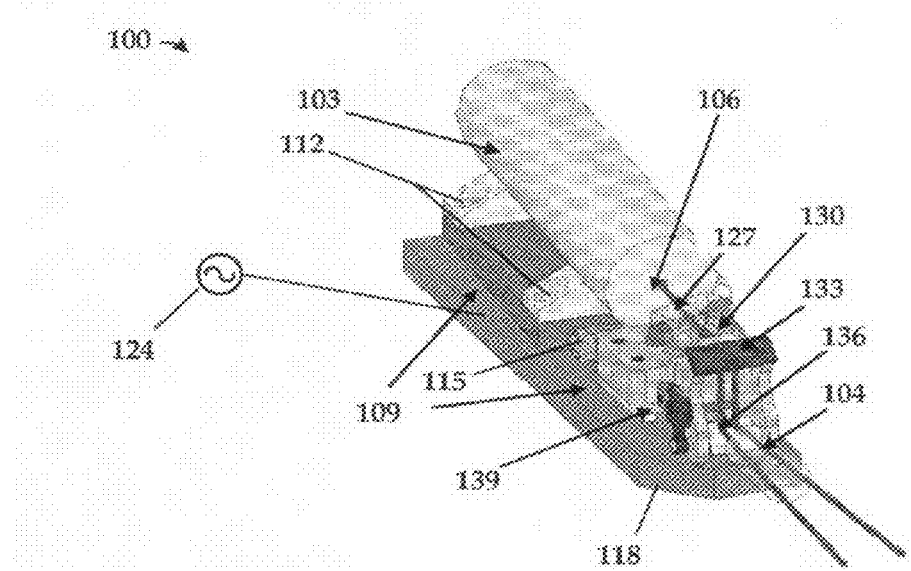

To clarify ODIS an introduction of the VAL transmitter scanner 100, shown in FIG. 1A and FIG. 1B, precedes ODIS receiver architecture and signal processing. The VAL transmitter 100 incorporates a laser, various optical components and mechanical devices. VAL sweeps the transmitted laser beam in angle with an acousto-optic modulator ("AOM") as the AOM also frequency encodes the angle of that sweep used for unique azimuth angle processing by ODIS, filling the classical forward blind zone found in radar DBS. In addition, the transmitted laser beamwidth may be varied to suit mission requirements such as extending range detection by narrowing the transmitted beam or speeding image formation by expanding the beam to cover a larger area on the ground.

FIG. 1A and FIG. 1B illustrate a VAL transmitter scanner 100 in accordance with one particular embodiment. The apparatus 100 comprises a laser 103 capable of generating a laser signal 106 exiting a platform (not otherwise shown in FIG. 1A-FIG. 1B) through an aperture 104. The laser 103 may be a continuous wave laser, for example, an unswitched fiber laser, an unswitched diode laser, or an unswitched gas laser, or it may be a pulsed laser known to the art.

The laser 103 is affixed to a mechanical slide 108 comprising a sled 109 to which the laser 103 is affixed. The laser 103 is affixed to the sled 109 in this particular embodiment by a plurality of fasteners 112 (only two indicated). The sled 109 is mounted to a pair of rails 115 (only one indicated) on a base 118, the rails 115 paralleling the direction 121 of propagation for the laser signal 106. A drive 124 powers the sled 109 to translate on the rails 115 in the direction 121 and, in some embodiments, to reciprocate. The laser 103 may accordingly be translated, and even reciprocated, by virtue of its affixation to the sled 109 as the sled 109 translates.

The illustrated embodiment also includes an AOM 127, an expansion lens 130, a deflection mirror 133, an elevation mirror 136, and a mirror adjust 139. A deflection mechanism 142 comprising a pair of reflecting mirrors 143, shown generally in FIG. 1A, is also included. Note that, as will be explained further below, not all these components are used for every application. In alternative embodiments, those components employed only in a mode not used may be omitted.

In the illustrated embodiment, both the translation of the laser 103 and the mirror adjust 139 are implemented using a commercially available drive mechanism sold under the mark PIEZOLEGS™ by: PiezoMotor Uppsala AB, Sylveniusgatan 5D, SE-754 50 Uppsala, Sweden, Telephone: +46 18 14 44 50, Fax: +46 18 14 44 53, E-mail: info@piezomotor.com. According to the manufacturer, this drive is a single solid body with four movable ceramic legs. The motor operates directly with no need for gears or mechanical transmission. The motive force is a material response to an applied voltage. The applied voltage controls the synchronized movement of each pair of legs, enabling them to move forwards and backwards.

This results in precise linear motion, taking steps typically no bigger than a couple of micrometers; steps that can be controlled in the nanometer range. By taking up to 10,000 steps per second, the motor can reach traveling speeds of several centimeters per second. Additional information about this particular drive may be found on the World Wide Web of the Internet at <www.piezomotor.com>. Note, however, that any suitable drive known to the art may be employed.

Thus, in the illustrated embodiment, the sled 109, rails 115, and drive 124 comprise, by way of example and illustration, a means for translating the laser 103. The translation of the laser 103 causes the beamwidth of the laser signal 106 to vary. Consequently, the translating means also comprises, again by way of example and illustration, a means for varying the beamwidth of the laser signal 106. Nevertheless, alternative embodiments may employ alternating translating means and even alternative beamwidth varying means.

Turning now to one mode of operation, the AOM 127 forms the core of the VAL transmitter 100 in this mode. The reflecting mirror 143 leave the laser signal 106 undeflected by the AOM 127 in one embodiment where only beam divergence need be managed for targets within the field of view established by that beamwidth. The AOM 127 acts as a scanner in the embodiment considered here. It shifts transmitted laser light (i.e., the laser signal 106) in angle as the frequency of the input from the voltage controlled oscillator ("VCO") 209 changes, shown in FIG. 2A, while simultaneously shifting transmitted laser frequency.

In the illustrated embodiment, the VCO 209 drives a piezoelectric transducer 206 such as is known to the art. As frequencies propagate through the longitudinal axis of the AOM 127, it also imparts an angle-specific frequency to the laser, higher with angle. Thus, the AOM 127 frequency encodes the laser signal 106 as it sweeps in either azimuth or elevation. The angle of the laser signal 106 output from the AOM 127 increases as the drive frequency from the VCO 209 does, though so do losses as high drive frequencies are also more inefficient. FIG. 2B graphs the drive power of the acoustic source as a function of the diffraction efficiency of the acousto-radio material for the acousto-optic modulator of FIG. 2A. This inefficiency places a practical limit on the AOM 127 induced angle displacement of approximately 4°.

The AOM 127 sweeps the frequency encoded laser signal 106 in azimuth. Electrical control of the AOM 127 angle depends on the speed of the VCO 209. One suitable, commercially available VCO is the Brimrose AOM frequency shifter IPF-600-200 and driver FFF-600 which can easily achieve a 3 dB modulation bandwidth of 100 kHz over a 600 MHz sweep range which translates into a full 600 MHz sweep in 10 μs. More information is available from Brimrose Corporation of America, 19 Loveton Circle, Baltimore, Md. 21152-9201, telephone: 410-472-7070, facsimile: 410-472-7960, or over the World Wide Web of the Internet at <http://www.brimrose.com/>.

Even with platform 300 velocities of mach 1 this is only a 3 mm change in position over a full sweep in frequency and angle, thus repeated sweeping of ground cells are not a challenge, though sweep rate must be balanced with integration time for non-coherent detection threshold requirements and coherent aperture time requirements of Doppler filter bandwidths. Other VCOs can attain significantly higher 3 dB modulation bandwidths and thus shorter sweep times.

Figure 1C:
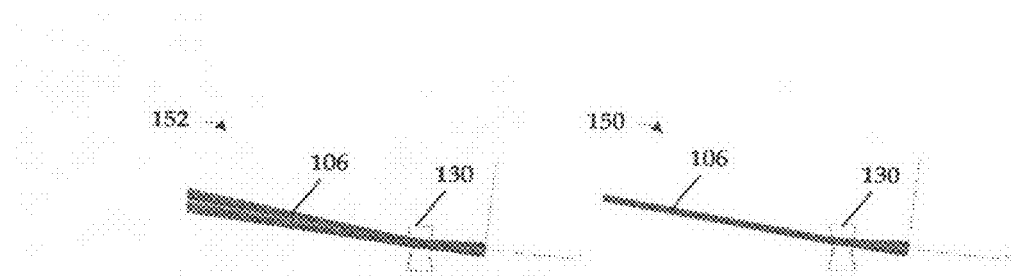
FIG. 1C illustrates the beam expansion lens action for the VAL transmitter of FIG. 1A-FIG. 1B.

After the laser signal 106 passes through the AOM 127 it reaches the expansion lens 130. The laser 103 is mounted by the translating means as discussed above which moves the laser 103 toward or away from the expansion lens 130. The laser exit optic (not shown) has a focal point (also not shown) associated with the expansion lens 130, thus any laser movement results in a repositioning of that focal point with laser motion. This action expands or narrows the transmitted laser beam 106 as shown in the right image 150 of FIG. 1C expanded by laser lateral displacement differing by 0.3 inches resulting in an expansion of the beam as shown in the left image 152 of FIG. 1C.

As the AOM 127 both frequency modulates and angle adjusts the laser signal 106 in azimuth, the laser signal 106, upon exit from the AOM 127, strikes the expansion lens 130 at different locations which serves to exaggerate the angle initially imposed by the AOM 127 allowing for a full angle scan of about twice the practical limit of the AOM 127 of 4° to approximately 8°. This function allows a lower drive frequency from the VCO 209 of the AOM 127, resulting in smaller AOM 127 induced deflection angles and lower laser loss. However, this exaggerated angle causes a slight spreading of the laser signal 106 that varies with angle incident upon the expansion lens 130. Out of the expansion lens 130 a deflection mirror 133 directs the laser signal 106 to an elevation mirror 136, adjusted by a lever 139 controlled by piezo legs.

To further an understanding of VAL and its use by ODIS, the theory of operation for the AOM 127 will now be briefly described. AOMs are known to the art, and use several fundamental physical principles, for the most part light diffraction and interference. However, they also manipulate interactions of light with materials, characteristics of gratings and the Doppler effect. As employed here the AOM 127 may be more specifically referred to as an acousto-optic frequency shifter, as AOMs can be used for a variety of functions including not only frequency shift but amplitude modulation and fast beam displacement over multiple physical communication channels. For instance, AOMs can shift a light beam by a specific frequency through Brillouin scattering and do so by only the sum or difference of the modulation frequency with no inter-modulation products created in the process. The modulating frequency is that of an acoustic wave transmitted through a transparent medium which a passing laser beam interacts with, acquiring a component of the medium's movement as a Doppler shift added to or subtracted from that of the laser.

Figure 2A:
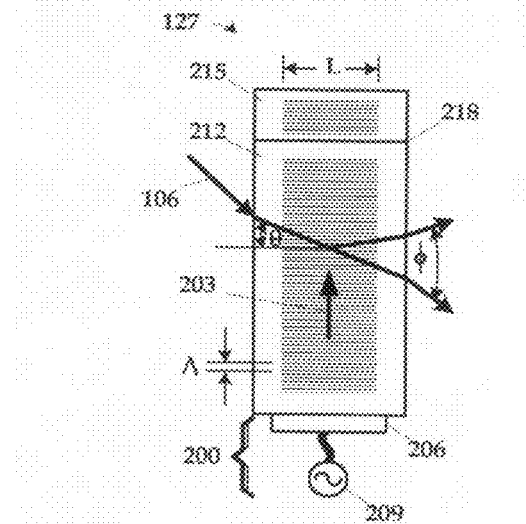
FIG. 2A illustrates the principle of operation for the acousto-radio modulator of FIG. 1A-FIG. 1B.
Figure 2B:
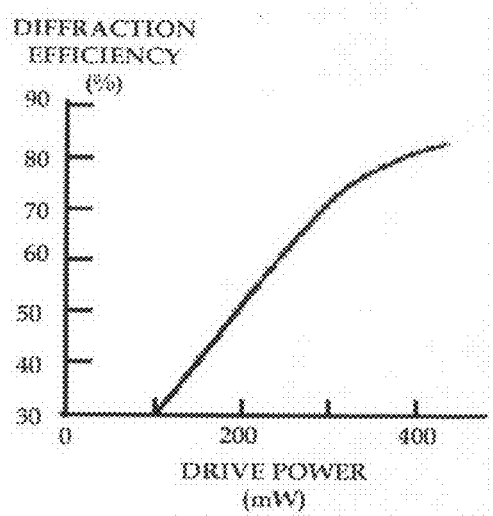
FIG. 2B graphs the drive power of the acoustic source as a function of the diffraction efficiency of the acousto-radio material for the acousto-optic modulator of FIG. 2A.

FIG. 2A-FIG. 2B illustrate one particular embodiment of the AOM 127 and its principle of operation. When a sound wave travels through a transparent material it produces periodic variations in the index of refraction. The sound wave can be considered as a series of compressions and rarefactions moving through the material. In regions where the sound pressure is high the material is slightly compressed yielding an increase in index of refraction (higher density). The increase is small, but can produce large cumulative effects on a light wave passing some distance through a material.

For the AOM 127, the sound wave (represented by the arrow 203) is produced by a piezoelectric transducer 206 which exhibits a slight change in physical size when voltage is applied by a VCO 209. The piezoelectric transducer 206 is placed in contact with a transparent acousto-optic material 212 and an oscillating voltage is applied to the piezoelectric transducer 206 from the VCO 209. The piezoelectric transducer 206 expands and contracts as the applied voltage varies, in turn exerting pressure on the acousto-optic material 212, launching sound waves 203 through it. The AOM 127 also includes an acoustic termination 215 at the opposite end 218 of the acousto-optic material 212 from the piezoelectric transducer 206 to suppress reflected acoustic waves (not shown).

With each sound wave variation in material density (and associated variation in index of refraction) a reflection and transmission of light occurs for a laser beam passing through the material just as at any index-differing interface such as an air/glass boundary. That portion of the wavefront which continues on as the transmitted component also travels slightly further though the medium acquiring a phase change with respect to its neighboring rays. When that portion meets the next index variation at the next sound wave maxima, once again a reflection and transmission occurs. There is an accumulation of periodic, and repeating, phase adjustments that eventually emerge as local elemental emitters of the same frequency but differing phases from place to place across the material surface. These alternate compressions and rarefactions associated with the sound wave form a transmission grating that diffracts passing light like any diffraction grating.

As far as impinging light waves are concerned the sound wave stands still, hence a stationary grating effect. No light is deflected unless the acoustic wave is present.

This repetitive light/sound wave interaction through the medium results in an accumulation of phase differing waves to interfere with each other thus creating external orders and enhancement in amplitude with each sound-wave-reflected ray added to the last. This makes the amplitude of the diffracted light beam a function of the radio-frequency power applied to the transducer. That is, power to the transducer controls deflected light intensity because there becomes a stronger compression within the medium and hence a greater index change off of which a reflection takes place. FIG. 2A displays the AOM arrangement for "contradirectional" scattering in an isotropic medium.

From a quantitative perspective, L is defined as the interaction length between the laser signal 106 and the sound wave 203. Like any wave phenomenon, the relation between wavelength and velocity (in the material) is given by:

$$V = \Lambda F \quad (1)$$

where:
V=the velocity of propagation of sound in the acoustic medium
Λ=the wavelength of sound in the acoustic medium, and
F=the drive frequency of the VCO 209.
Variation of the piezo-drive frequency sets acoustic wavelength, Λ.

FIG. 2A also defines what is called the "small" Bragg angle θ, as is seen in X-ray diffraction off parallel periodic atomic sheets in a crystal, but in this case the parallel planes are sound wave induced index variations. The acoustic wavelength (or grating spacing) is a function of the piezo-drive where the acoustic wavelength also controls the angle of deflection. θ is given by:

$$\theta = \frac{\lambda_n}{2\Lambda} \quad (2)$$

where:
$\lambda_n$=the light wavelength in the material or λ/n, where λ is the freespace wavelength
n=the index of refraction.
The Bragg angle gives that angle at which the most efficient reflection occurs.

FIG. 2B shows how drive power affects the performance of an unspecified commercial acousto-optic device, delineating diffraction efficiency—that is, what percentage of input laser power goes into the diffracted beam as a function of piezo-drive power. Diffraction efficiency increases with piezo-drive power, then saturates at a value near 100%. AOMs typically achieve 1st order beam powers of 85-95% of the incident light power, with little remaining for the 0th order. This means that almost all incident light enters the diffracted beam. For the example shown it takes a few hundred milliwatts to reach high values of diffraction efficiency. For other devices, it may take several watts.

The exit 1st order beam is angularly removed from the 0th order by 2θ or Φ in FIG. 2A. Now knowing how the exit beam is internally reflected and how accumulated phase differences between elements of the beam provide the equivalent of a grating with resulting transmitted orders, the last thing to realize is that the incident light beam has picked up the sound wave frequency through Doppler shift. The result is that a 1st order exit beam is composed of the light frequency plus or minus the sound wave frequency, depending on whether the laser signal 106 is inserted toward or away from the sound wave 203.

Thus, in this particular aspect, the invention is a laser apparatus, comprising a laser capable of generating a laser signal; means for conditioning the laser signal; and means for scanning the conditioned laser signal into a field of view. The scanning means includes means for electro-optically sweeping the conditioned laser signal in azimuth; and means for sweeping the conditioned laser signal in elevation.

In the illustrated embodiment, the conditioning means includes the expansion lens 130. The expansion lens 130 modifies the beam divergence of the laser signal 106. The conditioning means also includes the AOM 127, which frequency modulates, i.e., frequency encodes, the laser signal 106 as it sweeps it in azimuth. Also note that alternative embodiments may employ alternative means for conditioning the laser signal 106, again depending on the design constraints of any given implementation. Accordingly, the disclosed conditioning means is but one means for conditioning a laser signal in accordance with the present invention.

The scanning means, more particularly, includes an electro-optically, azimuthal sweeping means, i.e., the AOM 127 and, in the illustrated embodiment, a mechanical elevational sweeping means, i.e., the electrically driven mirror 133. Note, however, that alternative embodiments may employ, for example, a second AOM 127 instead of the mirror 133 to sweep in elevation. The elevation sweeping means is therefore not limited to a mechanical sweeping means. Accordingly, the disclosed scanning means is but one means for scanning the conditioned laser signal into a field of view in accordance with the present invention and other means may be employed in alternative embodiments. Note also that the AOM 127 both sweeps and conditions, and so comprises a portion of both the scanning means and the conditioning means in this mode of operation.

As was mentioned above, some alternative embodiments may employ only one or the other of the two modes and therefore might experience some hardwire modification to streamline the apparatus. For example, embodiments might omit the AOM 127 by rerouting laser signal 106 around the AOM 127 by mirrors 142. Other embodiments might similarly omit the translating means used to expand or contract the beam divergence.

Thus, at least in the illustrated embodiment:
the VAL transmitter 100 is composed of a longitudinally movable laser 103, an AOM 127 driven by a piezo modulator 200, an expansion lens 130, an adjustable mirror 136, a flat mirror 133 and various mounting objects.
longitudinal movement of the laser 103 results in laser beamwidth adjustment due to the expansion lens 130.
by virtue of its piezo-drive 200, the AOM 127 shifts the laser beam 106 in azimuth for azimuth scanning.
by virtue of its piezo-drive 200, the AOM 127 can vary signal amplitude for signal to noise ratio ("SNR") or low probability of intercept ("LPI") management.
azimuthal movement imparted by the AOM 127 is amplified by the expansion lens 130, thus reducing stress on the AOM 127 and improving loss performance.
the AOM 127 shifts the laser signal 106 in frequency as the laser signal 106 moves in azimuth, thus encoding azimuth angle with frequency.
the adjustable mirror 136 scans the laser signal 106 in elevation.
by virtue of its piezo-drive 200, the AOM 127 can be varied in amplitude allowing a tag to be attached to transmissions of each elevation angle. This variation in transmit signal allows an additional encoding method—generally some AM format—giving AM sidebands at some modulation frequency away from the carrier.

the VAL transmitter 100 provides five degrees of freedom where most scanners provide two—namely, azimuth sweep, elevation sweep, frequency sweep, beamwidth management, and amplitude modulation.

Note that not all embodiments will exhibit all these characteristics. Furthermore, some alternative embodiments may manifest characteristics in addition to or in lieu of those set forth above for the illustrated embodiment.

Figure 3:
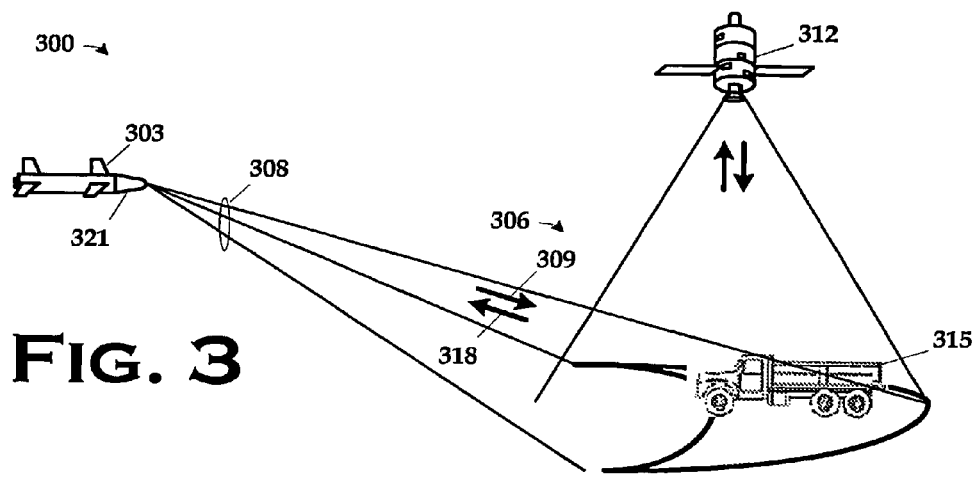
FIG. 3 conceptually illustrates one particular scenario in which a platform may employ the present invention in the remote sensing of a field of view.
Figure 4A:
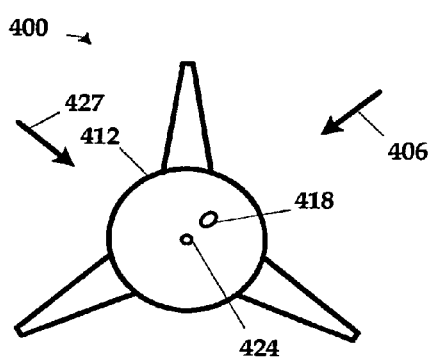
FIG. 4A-FIG. 4B depict one particular embodiment of the forward end of the platform of FIG. 3.
Figure 4B:
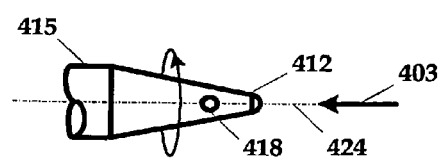

In a scenario 300 shown in FIG. 3, the VAL transmitter scanner apparatus 100 is carried aboard a platform 303. The platform 303 is, in this particular embodiment, an airborne vehicle and, more particularly, a missile. One advantage of the VAL transmitter scanner system 100 is that it does not require the high-drag, hemispherical radome of conventional LADAR systems. Thus, the radome may be, for instance, an Ogive or Von Karman radome, or some other relatively low drag, sleek radome. FIG. 4A and FIG. 4B illustrate one such radome 412 of the forward end 321 of the platform 303 of the illustrated embodiment.

More particularly, FIG. 4A is a plan, head-on view of the embodiment 400 from the perspective of the arrow 403 in FIG. 4B. FIG. 4B is a plan, side view of the embodiment 400 from the perspective of the arrow 406 in FIG. 4A. The embodiment 400 includes a radome 412 affixed to the fuselage 415 of the platform 303. The embodiment 400 also includes one optical channel 418 through which the embodiment 400 receives the reflected signal. The optical channel 418 is situated on the radome 412. The embodiment 400 also includes an aperture 424 through which the VAL transmitter 100 may transmit the optical signal, i.e., the laser signal 106.

Figure 5:
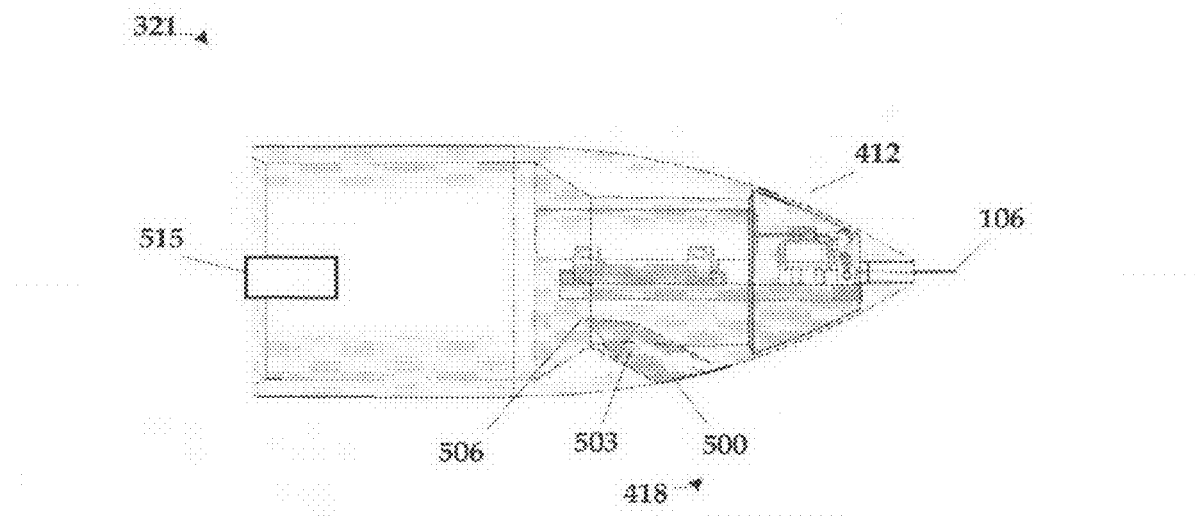
FIG. 5 illustrates, in cross-sectional side view, the positioning and operation of the VAL transmitter of FIG. 1A-FIG. 1B in the forward end of FIG. 4A-FIG. 4B.

FIG. 5 illustrates in a cross-sectional side views the positioning and operation of the VAL transmitter 100 in the radome 412 of FIG. 4A-FIG. 4B. The optical channel 418 includes a window 500. The window 500 is fabricated from a material that transmits the incident radiation—i.e., a laser signal—but can also withstand applicable environmental conditions. In the illustrated embodiment, one important environmental condition is aerodynamic heating due to the velocity of the platform 303. Another important environmental condition for the illustrated embodiment is abrasion, such as that caused by dust, sand or rain impacting the window 500 at a high velocity. Thus, for the illustrated embodiment, fused silica is a suitable material for the window 500. Alternative embodiments may employ ZnSe, Al2O3, and Ge.

However, depending upon a number of factors, including shape of the radome 412, strength of the window materials, manufacturability, and cost, it may be preferable to implement the window 500 collectively as a collar (not shown) extending around the perimeter of the radome 412. Thus, the window 500 comprises a windowing system that, in alternative embodiments, may be implemented in a collar. In addition, while the window 500 has a constant thickness, the thickness may vary in some embodiments, e.g., the window thickness may vary linearly.

Still referring to FIG. 5 the optical channel 418 further includes a light pipe 503 and a detector 506. Note that some embodiments may employ baffles (not shown), light tubes (not shown), reflectors (not shown), bandpass filters (also not shown), and other types of components as are known in the art. The light pipe 503 acts as a waveguide to direct the radiation transmitted through the windows 500 to the detectors 506.

In the illustrated embodiment, the detector 506 comprises a photomixer such as is well known in the art. The detector 506 is comprised of materials suited to the particular application. For a particular application where high speed, wide bandwidth detectors are desired for proper reception of narrow pulses, small, low capacitance InGaAs detectors may be used or suitable Si PIN detectors. Long range detection may employ using avalanche photodiode detectors if background noise is accounted for. Detector material type, size and electrical characteristics common in the art will be dependent on the specific application.

The detector 506 should be mechanically robust to withstand vibrations and stresses encountered during launch and operation of the platform 303. The detector 506 absorbs the received radiation and, thus, selection of the radiation detector 506 depends upon the wavelength of the received radiation. Furthermore, it may be desirable for the radiation detector 506 to respond to very short durations of the received radiation. Photomixers comprised of semiconductor material typically meet these requirements.

While the description to this point has assumed a single element in the detector 506, this is not required. If the detector 506 actually comprises two or more individual detector elements (not shown), additional noise reduction is possible. For example, by summing the signals from each individual detector element, the noise in the signal from one detector element will partially cancel the noise in the signal from another detector element. When two or more individual detector elements form each detector 506, it is preferable to focus the radiation across all of the individual detector elements such that each is approximately equally illuminated by the radiation. The detected signal is then captured and processed by ODIS 515 that may, in the illustrated embodiments, operate in a coherent embodiment or as non-coherent embodiment, as is discussed further below.

Figure 6A:
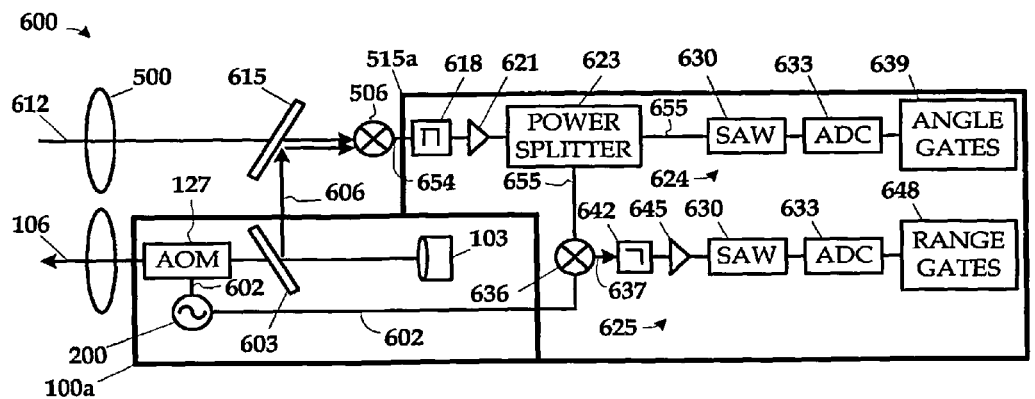
FIG. 6A-FIG. 6H illustrate the operation of a laser apparatus employing the current invention in a non-coherent signal processing embodiment.
Figure 7A:
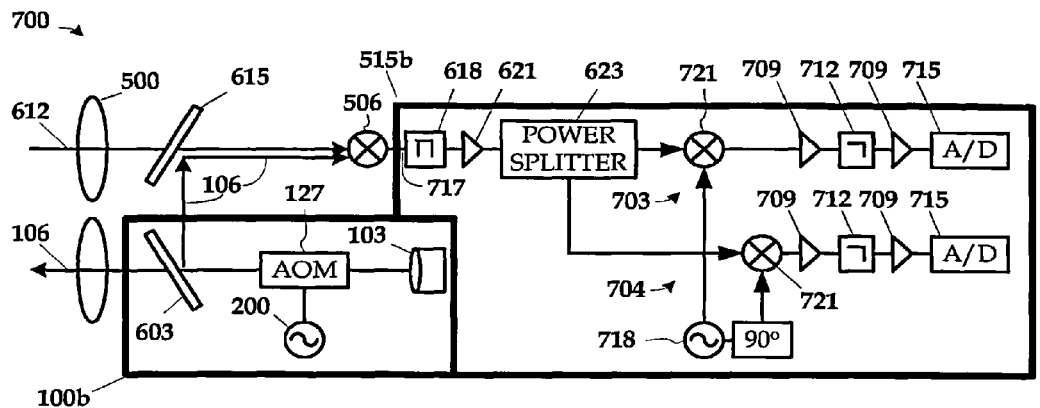
FIG. 7A-FIG. 7C illustrates the operation of a laser apparatus employing the current invention in a coherent signal processing embodiment.

FIG. 6A and FIG. 7A conceptually illustrate the VAL transmitter 100 and the ODIS 515 in non-coherent and coherent embodiments 600 and 700, respectively. The non-coherent embodiment 600, as shown in FIG. 6A, is used with the VAL transmitter 100a in the first operational mode thereof. The coherent embodiment 700 shown in FIG. 7A, is used with the VAL transmitter 100b in the second operational mode thereof.

Turning now to FIG. 6A and the non-coherent signal processing embodiment, the operational interface 600 includes an interface between a VAL transmitter scanner 100a and an ODIS receiver 515a. Note that the beam splitter 603 is placed "before" the AOM 127. The VAL transmitter 100a includes a laser 103 and the AOM 127 controlled by the oscillator 200 composed of the VCO 209 and piezoelectric transducer 206. It also includes a beam splitter 603, not previously shown, that splits the laser signal 106 and directs a portion 606 into the receive path described below.

The reflected return signal 612 is detected by the detector 506 through the window 500. The portion 606 of the transmitted laser signal 106 is redirected to the detector 506 by the mirror 615, also not previously shown. Note that the mirror 615 does not block the reflected return signal 612 in this particular embodiment. The detector 506 therefore receives and detects the portion 606 as well as the reflected return signal 612. Note that the detector 506 converts the reflected return signal 612 to a radio frequency signal 654. Given the heterodyne nature of signal processing on the photodiode surface, the detector 506 is a photomixer.

The detected signal 654 is then conditioned by a bandpass filter 618 and a low noise amplifier 621 whereupon the conditioned signal is split by the power splitter 623. The ODIS 515a includes two-channels 624-625. The first channel 624 receives the detected signal 612 mixed with the split portion 606 on the photomixer/detector 506 creating a down-converted difference signal, also known as the beat frequency 555, routed to and emerging from the power splitter 623. The second channel 625 receives the same signal 655 from the power splitter 623 which is then mixed by an RF mixer 636 with the output 602 of the VCO 209 of the drive 200 also driving the AOM 127. The result of mixing signal 654 with signal 602 is the down-converted signal 637.

Each of the channels 624-625 includes a surface acoustic wave ("SAW") device 630, or a plurality of SAWs, to reduce noise bandwidth. A plurality of SAWs covering the same bandwidth of one SAW 630 can be made with narrower passbands to lower noise. The SAW 630 converts signals in frequency to signals in time which are then sampled by analog-to-digital converters ("ADC") 633 as are known in the art. Through this conversion from frequency to time, signals encoded in frequency by the AOM 127 and adjusted by Doppler frequency returns from the ground, if present, become signals encoded by time-of-arrival ("TOA") where clock markers for start-time are at the beginning of each AOM 127 sweep.

The first channel 624 creates, through signal processing, a plurality of angle gates 639 that derive the angle of individual ground cells as seen from the platform 300, shown in FIG. 3. The second channel 625 includes a bandpass filter 642 and a low noise amplifier 645 to further condition the mixed detected signal 637. The second channel 625 further creates, through signal processing, a plurality of range gates 648 that then derives the range from the digitized, conditioned, mixed signal 637. In each channel 624, 625, the digitized signal is sampled and the time is correlated to the derived quantity. For moving platforms a Doppler frequency adjusts the return signal depending on where the illuminated ground cell resides in the FOV. This adjustment to frequency must be corrected for in software as described below.

Figure 6B:
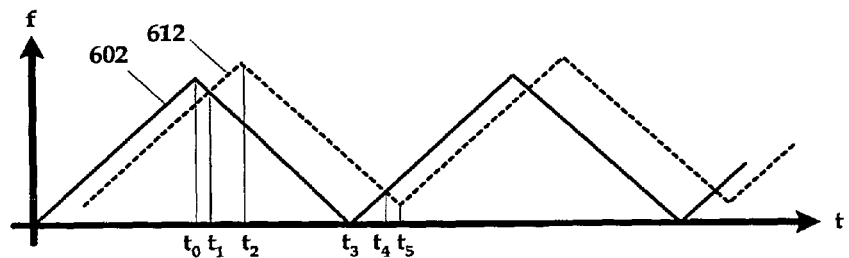
Figure 6C:
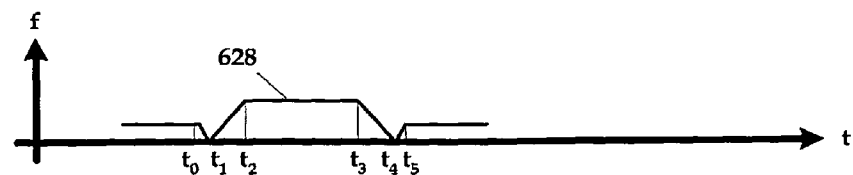

To clarify signal processing operations employed by ODIS 515, first consider FIG. 6B and FIG. 6C, which introduce certain characteristics for the case of a moving platform of signal processing well know to the art of traditional LFM. Note that the timelines in FIG. 6B and FIG. 6C are correlated. Notice that 612 is drawn higher in frequency than 602 due to a Doppler frequency shift imposed by a moving target.

The traces 602, 612 in FIG. 6A graph the frequency of the transmitted and received signal, respectively, over time. Since the waveform cannot be continually changed in one direction indefinitely a periodicity in rise and fall of frequency modulation is required. This modulation need not be triangular as shown in FIG. 6B, but may be saw-tooth, sinusoidal or some other form well know to the art.

The trace 628 of FIG. 6C graphs the up and down beat frequencies over time, as represented by low and high plateaus respectively in FIG. 6C, as created by the mixing process of the photomixer 506 between trace 602 and trace 612 of FIG. 6B. Following traditional LFM practice the up frequency beat ("$f_{b\text{-}up}$") can be determined as follows:

$$f_{b\text{-}up} = \frac{2Rf_r}{c} - \frac{2v}{\lambda} \tag{3}$$

where this frequency is represented by the lower plateau of trace 628 in FIG. 6C and:
R=range to the point of reflection;
$f_r$=rate of frequency change of the transmitted ramp;
c=speed of light;
v=closing velocity of platform and point target
λ=laser transmit wavelength The down beat frequency ("$f_{b\text{-}dn}$") can be determined as follows:

$$f_{b\text{-}dn} \equiv \frac{2Rf_r}{c} + \frac{2v}{\lambda} \tag{4}$$

where R, $f_r$, c, v, and λ are defined as above and this frequency is represented by the higher plateau of trace 628 in FIG. 6C. Addition of the up and down beat frequencies yields the range R:

$$R = c\frac{f_{b\text{-}up} + f_{b\text{-}dn}}{4f_r} \tag{5}$$

where R, c, $f_{b\text{-}up}$, $f_{b\text{-}dn}$, and $f_r$ are defined as above. Subtraction of the up and down beat frequencies yields the velocity v of a point target:

$$v = \lambda\frac{f_{b\text{-}dn} - f_{b\text{-}up}}{4} \tag{6}$$

Figure 6D:
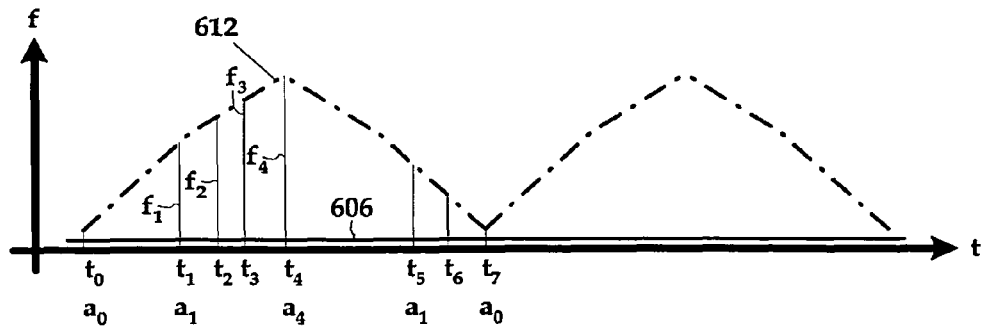

With traditional LFM in mind, signal processing differences are elaborated in FIG. 6D for the "non-coherent" signal processing embodiment of ODIS 515a on a moving platform 300 where the received signal 612 is shown with the unshifted laser local oscillator signal 606. Frequencies represented by $f_1$, $f_2$, $f_3$ of FIG. 6D are beat frequency products of heterodyning the received signal 612 with laser local oscillator 606 on the photomixer 506 resulting in signal 654 of FIG. 6A, which then enters the first channel 624. Trace 612 begins at sample time $t_o$ which is the point just before the AOM 127 frequency sweep begins, where the AOM 127 imposes no deflection with no frequency encoding. Trace 612 is elevated above the trace 606 because, in this particular embodiment, each return signal from the ground over the FOV has been Doppler frequency shifted, induced by motion of the platform 300. Since trace 606 in FIG. 6D is the unmodulated laser local oscillator frequency, it is flat and always a constant.

The FOV can be seen to extend from the left edge where the AOM 127 begins its frequency and angle sweep to the right edge where it ends that sweep. Starting at the right edge as noted in trace 612 the AOM 127 then returns over the same ground cells by descending in frequency at the same sweep rate until it again meets the left edge and the same ground cell it began with. Motion of the platform 300 or manipulation of the elevation mirror 136 of VAL 100a allows for the next ground strip to be illuminated and data collected.

Along the base of FIG. 6D are sample times at which the beat frequencies $f_1$, $f_2$, $f_3$ are measured. Passing these frequencies through a SAW results in TOAs proportional to their frequencies, hence the vertical axis of FIG. 6D is marked to indicate both frequency and TOA. Each TOA associated to a particular frequency will then be associated to a unique angle due to the frequency encoding of AOM 127 and indicated along the base of FIG. 6D as $a_o$, $a_1$, $a_4$, $a_1$, $a_o$. Notice that as time progresses from $t_o$ to $t_7$ that angles are repeated from $a_o$ to $a_o$. This indicates that each ground cell is illuminated on the way up in frequency and again by the return sweep on the way down, each being visited by the laser beam 106 twice before progressing to subsequent ground cell strips in the scene. Adjustment to the measured frequency value due to Doppler frequency shift imposed by the ground will be corrected for as discussed below, noting that the Doppler frequency of each ground cell is given by $$f_d = \frac{2v}{\lambda}\cos\theta \quad (7)$$

where $\theta$ is the angle of each ground cell as measured from boresight where the platform 300 velocity vector and boresight are assumed to match, $f_d$ is the measured Doppler frequency, v is the platform 300 speed, and $\lambda$ is the transmitted wavelength 106.

Figure 6E:
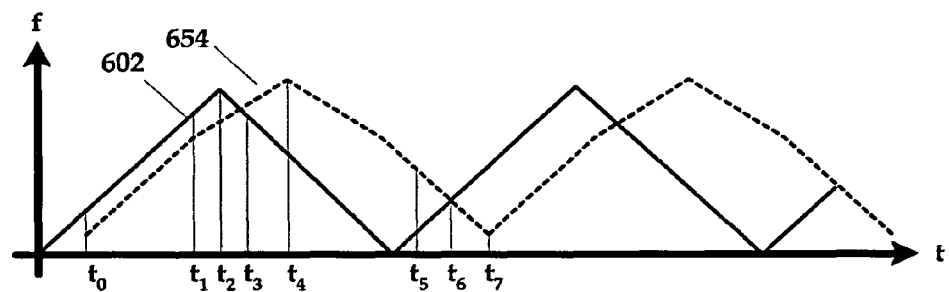
Figure 6F:
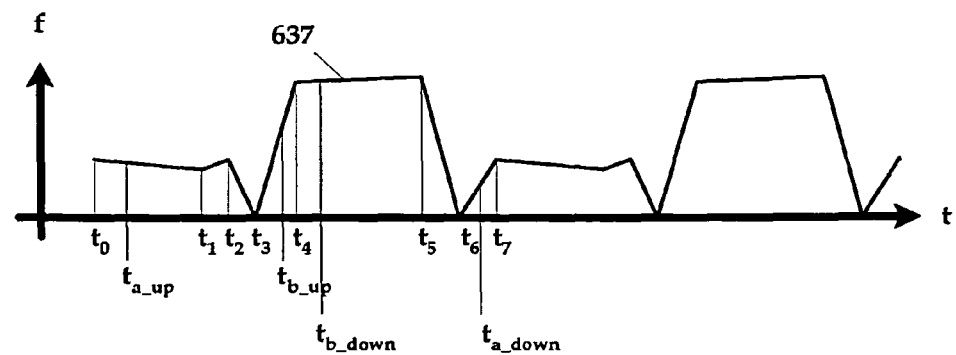

FIG. 6E-FIG. 6F further clarify differences between the signal processing of ODIS 515a as the analogs of traditional LFM shown in FIG. 6B-FIG. 6C. In FIG. 6E we see a replica of trace 612 of FIG. 6D, now down-converted to a lower frequency after emerging from the photomixer 506 as trace 654. Trace 602 is the signal from oscillator 200 including VCO 209. Both 654 and 602 are received by the mixer 636 of the second channel 625 to produce trace 637 of FIG. 6F. Note that the timelines in FIG. 6E and FIG. 6F are correlated.

FIG. 6D and FIG. 6F imply that samples in time must be stored in order to operate on values after collection for correction and proper image formation. These values, which are frequencies vs. time, become merely numbers as TOAs in digital memory. At time $t_o$ of FIG. 6E with no frequency modulation yet imposed, a ground cell at the left edge FOV is measured to have a return frequency as shown in trace 654 modified by Doppler at that angle. As the beam begins it sweep from this point, transmitted light is frequency modulated by the AOM 127. As it approaches boresight, Doppler frequency contributions from the ground increase according to Eq. (7) thereby increasing the slope of the LFM originally imposed only by the AOM 127.

At time $t_1$ it can be seen from the received signal trace 654 that the measured reflection had arrived at boresight with a maximum Doppler frequency contribution from the illuminated ground cell. By the conditions of flight assumed for FIG. 6D-FIG. 6F leading to the line segment slopes of trace 654 and 637 a saddle in the frequency difference 637 between 654 and 602 can be seen at $t_1$. After boresight that difference rises briefly then drops to zero where the two traces cross. The transmit sweep 602 is descending after time $t_2$, while the received signal 654 continues to rise in FIG. 6E, the beat frequency 637 of FIG. 6F then rises steeply to time $t_4$ where the maximum angle is reached at the right edge FOV of 654. At $t_5$ the beat frequency 637 of FIG. 6F becomes a maximum due to the received beam 654 of FIG. 6E having swept back down to boresight where the illuminated ground cell Doppler contribution is again largest. Eventually the swept beam returns to the FOV left edge where the process begins for the next row of ground cells for imaging.

The process to measure both Doppler and range follows that used for traditional LFM as shown in FIG. 6B-FIG. 6C, where the analogies to Eq. (3) and Eq. (4) with suitable change to frequency subscripts associated to times $t_1$ and $t_5$ where Doppler is a maximum at boresight of FIG. 6E are:

$$f_{t1} = \frac{2Rf_r}{c} - \frac{2v}{\lambda} \quad (8)$$

where R, $f_r$, c, v and $\lambda$ are defined above. For the down sweep:

$$f_{t5} = \frac{2Rf_r}{c} + \frac{2v}{\lambda} \quad (9)$$

Likewise, following Eq. (5) and Eq. (6) with suitable changes in frequency subscripts for $t_1$ and $t_5$, range and velocity on boresight where maximum Doppler occurs at boresight of FIG. 6E are:

$$R = c\frac{f_{t1} + f_{t5}}{4f_r} \quad (10)$$

$$v = \lambda\frac{f_{t5} - f_{t1}}{4} \quad (11)$$

The same process is then applied to pairs of stored values on the same physical side of boresight, which in trace 654 of FIG. 6E may appear to be on opposite sides of boresight. For example, the first value after $t_o$ and the last before $t_7$ labeled respectively as $t_{a\_up}$ and $t_{a\_dn}$ in trace 637 of FIG. 6F, are paired in equations Eq. (10) and Eq. (11) as these two values represent the same ground cell, visited by the transmit beam on the way up and once again on the sweep down. Likewise for the two values denoted by as $t_{b\_up}$ and $t_{b\_dn}$ in trace 637. As noted, as will be apparent to those skilled in the art having the benefit of this disclosure, there are a number of ways to retrieve the desired information from available data.

While recognizing each sample's frequency difference from its neighbor could easily allow assignment of angles adhering to the trend of Eq. (7), having the velocity for each sampled value does allow Doppler frequency correction for each ground cell sample implemented by subtraction of a calculated Doppler frequency (provided by the measured ground cell velocity from Eq. (11)) from the measured frequency revealing the original LFM imposed by the AOM 127 and hence an angle assigned to the measurement of each ground cell. Manipulation of data such as determining minimum and maximum frequency values stored in memory is a simple matter of software logic. In addition the start and stop of each sweep is known assisting in data manipulation and interrogation.

For the case of the non-coherent embodiment 600 of ODIS 515a on a moving platform each ground cell must receive the rise and fall of the saw-tooth waveform typical to standard LFM as both waveforms appropriately combined reveal Doppler and range information.

For the case of the non-coherent embodiment 600 of ODIS 515a on a stationary platform each ground cell need only receive a single illumination from the rise or fall of the saw-tooth waveform as no Doppler correction is required. For the angle channel 624, as the transmitted signal 106 dwells on a ground cell, a received signal similar to trace 612 of FIG. 6D is simultaneously received. But, contrary to trace 612 of FIG. 6D, it has no Doppler frequency adjustment. Thus, the trace of 612 for a stationary platform would have constant slope up and down as determined by the AOM 127 alone.

Figure 6G:
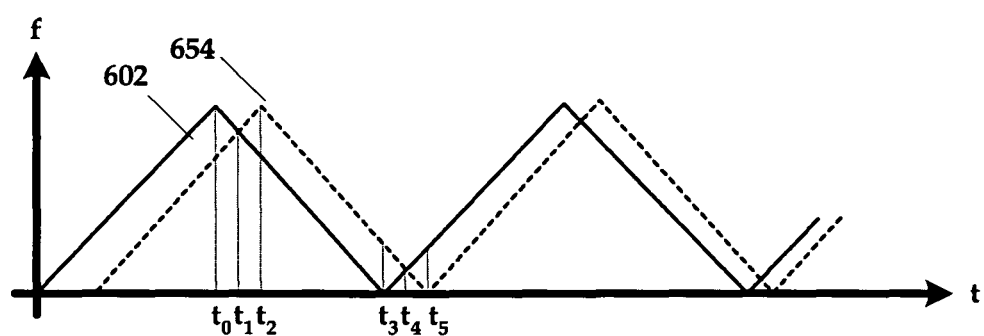
Figure 6H:
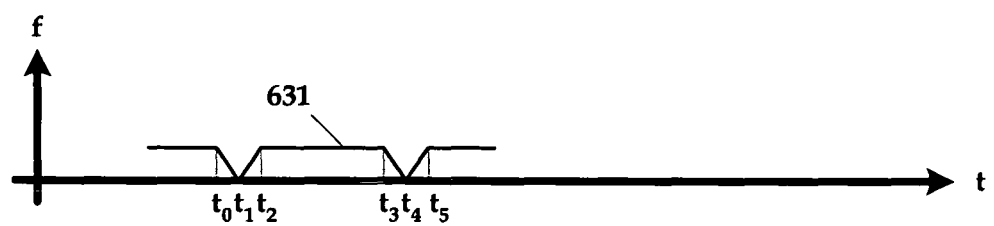

The beat frequency between 606 and 612 would therefore be converted to TOAs by the SAW 630 and become measured data in unique time values corresponding to unique angles. For the range channel 625, a received signal 654 and signal 602 from the VCO 209 are received by the mixer 636 of FIG. 6A. Mixing the signal 654 of FIG. 6G with the signal 602 creates the beat frequency 631 of FIG. 6H. Note that the timelines in FIG. 6G and FIG. 6H are correlated. Each ground cell will have just such a beat frequency proportional to range which is then converted into measurements in time by the SAW 630. As is well known to those skilled in the art, the traditional LFM beat frequency is proportional to range given the sweep rate and relationship between and travel time over range at the speed of light.

While the above noted process ultimately finds angle and range of each ground cell, the magnitude of each cell's return signal is also saved in memory as a number corresponding to a gray scale as is common in the art. Combination of range, angle and signal magnitude for each measurement would then compose an image of ground cells for visible inspection or automatic target recognition.

Thus, in the non-coherent embodiment illustrated in FIG. 6A-FIG. 6H, the ODIS 515a on a moving platform 300 is a SAW-based receiver. The SAWs 630 require no power, are inexpensive, and are readily commercially available. It has two-IF-receive channels 624 and 625 and has one receive channel 624 providing azimuth data by converting frequency to time in the SAW 630 while another receive channel 625 provides range by a similar method. It also places the AOM 127 after the transmit beam splitter 603.

The ODIS 515a frequency modulates the final transmit laser signal 106 using the AOM 127. The modulated reflected return signal 612 (modulated by the AOM 127 on transmit and by platform motion) is mixed on the photomixer 506 with the optical local oscillator which is the laser signal 606 unmodulated by the AOM 127 and thus produces an intermediate frequency ("IF"). This IF frequency is the difference frequency between the incoming reflected return signal 612 and the optical local oscillator 606, also known as the beat frequency 654.

The ODIS 515a splits the IF signal and delivers a half portion to the azimuth channel 624. It converts the IF frequency received to a pulse emerging from a SAW 630 at a time dependent upon that input IF frequency. This time corresponds to an angle. Since the IF difference frequency changes with angle, so does the time of the pulse out of the SAW 630. It splits and delivers a half portion of the IF signal for the range channel 625. And, it delivers a portion of the oscillator 200 output that drives the AOM 127 frequency modulation to an RF mixer 636 which receives both this VCO 209 output and the half portion of IF signal destined for the range channel 625.

Note that the IF difference frequency is a ramp in frequency over time and so is the oscillator 200 output. This is because the IF ramp comes from the VCO 209 to begin with. For a stationary platform they would be identically sloped ramps. For a moving platform the IF ramp has an additional slope by virtue of induced Doppler. Ignoring Doppler, the IF and VCO ramps will differ upon target signal reception by an amount proportional to round trip transit time commonly known in the art as LFM ranging. That is, while the VCO 209 has imposed a frequency shift on the transmit signal via the AOM 127, the VCO 209 continues to frequency sweep as that last bit of transmit signal goes out and comes back. By the time the target signal returns with its initial VCO frequency value the VCO 209 on-board has moved on to a new frequency. Thus mixing the IF ramp with the VCO ramp results in a difference frequency proportional to the round trip time which, given the speed of light, is then proportional to range.

The ODIS 515a converts the new IF/VCO IF frequency to a pulse emerging from the SAW 630 at a time dependent upon that input IF frequency. This time corresponds to a range. It then performs numerical manipulation and calculation of stored range and angle data to correct for Doppler frequency returns which adjust measured TOAs as representations of frequencies of range and angle.

As can be seen above, the non-coherent signal processing embodiment of ODIS 515a of FIG. 6A places the AOM 127 after the beam splitter 603 while the coherent signal processing embodiment ODIS 515b of FIG. 7A places the AOM 127 before the beam splitter 603. Doing so results in a variation in signal processing required to derive angle. While the first non-coherent embodiment measures angle directly from frequency encoding of the AOM 127, another means is available which does not measure angle but rather calculates it based on available data as presented here as the coherent signal processing version of ODIS 515b. Placement of the AOM 127 may be used in either manner, before or after the beam splitter in either the non-coherent embodiment or coherent embodiment with a suitable change to processing employed for angle finding.

Turning now to FIG. 7A, the coherent embodiment 700 includes a VAL transmitter 100b and an ODIS receiver 515b. Note that the beam splitter 603 is placed "after" the AOM 127. The ODIS receiver 515 includes two channels 703, 704. Each of the channels 703, 704 comprises a lowpass filter 712 sandwiched between two low noise amplifiers 709 and an ADC 715. The first channel 703 receives a portion of the reflected return signal 612 and the output of a second local oscillator 718. The second channel 704 receives a second portion of the reflected return signal 612 and the output of the second local oscillator 718 phase-shifted by 90° as is a common means in the art of deriving I and Q data for Doppler signal processing. The feed signals are mixed by RF mixers 721.

Figure 7B:
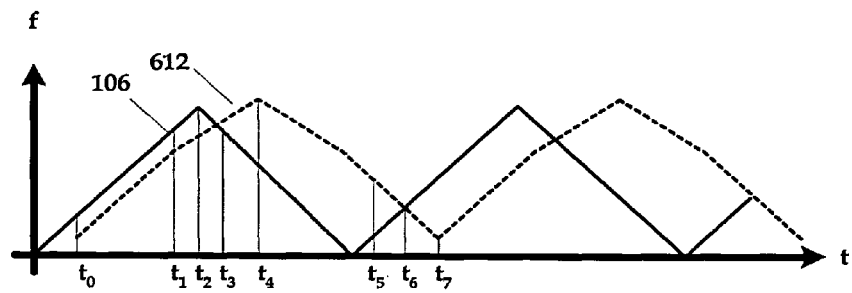
Figure 7C:
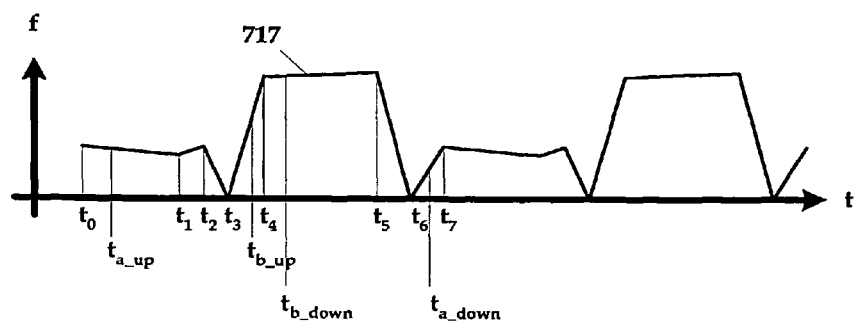

Following a process similar to the earlier non-coherent signal processing embodiment on a moving platform, samples in time must be stored in order to operate on values after collection for correction and proper image formation. These values, which are frequencies vs. time, become numbers as TOAs in digital memory. Again note that the timelines in FIG. 7B and FIG. 7C are correlated. At time $t_o$ of FIG. 7B with no frequency modulation yet imposed, a ground cell at the left edge FOV is measured to have a return frequency as shown in trace 612 modified by Doppler at that angle. As the beam begins its sweep from this point, transmitted light is frequency modulated by the AOM 127. As it approaches boresight, Doppler frequency contributions from the ground increase according to Eq. (7) thereby increasing the slope of the LFM originally imposed only by the AOM 127. At time $t_1$ it can be seen from the received signal trace 612 that the measured reflection had arrived at boresight with a maximum Doppler frequency contribution from the illuminated ground cell.

By the conditions of flight assumed for FIG. 7B-7C leading to the line segment slopes of trace 612 a saddle in the frequency difference 717 between 612 and 106 can be seen at $t_1$. After boresight that difference rises briefly then drops to zero where the two traces cross. The transmit sweep 106 is descending after time $t_2$, while the received signal 612 continues to rise in FIG. 7B, the beat frequency 717 of FIG. 7C then rises steeply to time $t_4$ where the maximum angle is reached at the right edge FOV of 612. At $t_5$ the beat frequency 717 of FIG. 7C becomes a maximum due to the received beam 612 of FIG. 7B having swept back down to boresight where the illuminated ground cell Doppler contribution is again largest. Eventually the swept beam returns to the FOV left edge where the process begins for the next row of ground cells for data collection.

The same process is then applied to pairs of stored values on the same physical side of boresight, which in trace 612 of FIG. 7B may appear to be on opposite sides of boresight. For example, the first value after $t_o$ and the last before $t_7$ labeled respectively as $t_{a\_up}$ and $t_{a\_dn}$ in trace 717 of FIG. 7B, are paired in Eq. (10) and Eq. (11) as these two values represent the same ground cell, visited by the transmit beam on the way up and once again on the sweep down. Likewise for the two values denoted by as $t_{b\_up}$ and $t_{b\_dn}$ in trace 717.

As noted, to those skilled in the art, there are a number of ways to retrieve the desired information from available data. While recognizing each sample's frequency difference from its neighbor could easily allow assignment of angles adhering to the trend of Eq. (7), having the velocity for each sampled value does allow Doppler frequency correction for each ground cell sample implemented by subtraction of a calculated Doppler frequency (provided by the measured ground cell velocity from Eq. (11)) from the measured frequency revealing the original LFM imposed by the AOM 127 and hence an angle assigned to the measurement. Manipulation of data such as determining minimum and maximum frequency values stored in memory is a simple matter of software logic. In addition the start and stop of each sweep is known assisting in data manipulation and interrogation.

For the case of the coherent embodiment 700 ODIS 515b on a moving platform each ground cell must receive the rise and fall saw-tooth waveform typical to standard LFM as both waveforms appropriately combined reveal Doppler and range information.

For the case of the coherent embodiment 700 of ODIS 515b on a stationary platform each ground cell need only receive a single illumination from the rise or fall of the saw-tooth waveform as no Doppler correction is required, just as was seen in the non-coherent processing embodiment. The implementation for range measurement will be that of traditional LFM shown in FIG. 6G-FIG. 6H as measured in channels 703 and 704 of FIG. 7A. Note that the timelines in FIG. 6G and FIG. 6H are correlated. As the transmitted laser 106 dwells on a ground cell, a received signal 654 of FIG. 6G is simultaneously received with no Doppler frequency adjustment.

Unlike the non-coherent embodiment the coherent embodiment correlates the angle command to the AOM 127 as this angle relates to the platform aspect. More specifically, when the ODIS 515b digital processor commands a certain angle that value then becomes the angle to which range and cell magnitude data is related as that data is simultaneously received. As is well known to those skilled in the art, traditional LFM beat frequency is proportional to range given the sweep rate and relationship between and travel time over range at the speed of light. Mixing 654 of FIG. 6G with 602 creates the beat frequency 631 of FIG. 6H. Note that the timelines in FIG. 6G and FIG. 6H are correlated. Each ground cell will have just such a beat frequency proportional to range which is then converted into measurements in time by the SAW 630. As stationary platforms hovering or attached to ground based structures have less restrictive timelines of operation compared to high velocity platforms the coherent processing embodiment need not add channels to uniquely define angle by encoded frequency.

While the above noted process ultimately finds angle and range of each ground cell, the magnitude of each cell's return signal is also saved in memory as a number corresponding to a gray scale as is common in the art. Combination of range, angle and signal magnitude for each measurement would then compose an image of ground cells for visible inspection or automatic target recognition.

Thus, at least in the illustrated embodiment, the ODIS 515b is a standard mixer-based RF receiver after the optical photomixer 506. It places the AOM 127 before the transmit beam splitter 603. It also frequency modulates the transmit VCO 209 and with the AOM 127. And, it employs LFM over the azimuth of the transmitted laser signal 106, that is, in one-dimension across the line of sight.

More generally, for all illustrated embodiments of the ODIS 515 is an optical imaging system conforming to high speed, sleek radomes via its flush mounted optics, as opposed to high drag hemispherical domes. It allows full forward imaging of a ground scene (unlike radar DBS which has a blind zone or SAR which looks to the side of boresight) thus allowing to-target guidance, not trajectory shaping as used in DBS and SAR. And uses only one phase sensitive optical receiver channel 503.

The ODIS 515 images using only one photomixer as its receiver detector—located at the end of the lone optical channel 418 as opposed to imaging systems that use charge-coupled devices ("CCDs") or FPAs with many thousands of pixels. Thus—in effect—it uses only "one pixel" to image a 2-D scene. It can image whether in motion or motionless (unlike SAR or DBS that must be on moving platforms) because of the frequency modulation imparted by the AOM 127 of the VAL transmitter 100. It can also image in any direction.

The ODIS 515 uses the VAL transmitter 100 as the transmitter/scanner, which is an on-board laser, as transmitter for ground illumination. The illustrated embodiments employ a continuous wave laser rather than a pulsed laser. This eliminates heavy, voluminous, and costly pulse modulation hardware. It also uses a "coherent processor" and uses "coherent detection" in a heterodyne process on the photomixer surface. If in motion, it can employ sub-beam resolution in the same way DBS does because each point will have associated with it a fixed AOM frequency and different Doppler frequencies within the beam due to their different relative motions.

The ODIS 515 performs two functions, 1) scans the transmit laser beam in azimuth, 2) encodes a frequency modulation leveraged in processing (a characteristic of VAL, which ODIS uses). It also performs numerical manipulations to data for correction and compensation depending on operational conditions. Note that not all embodiments will necessarily exhibit all these characteristics. Furthermore, some alternative embodiments may manifest characteristics in addition to or in lieu of those set forth above for the illustrated embodiment.

Figure 8:
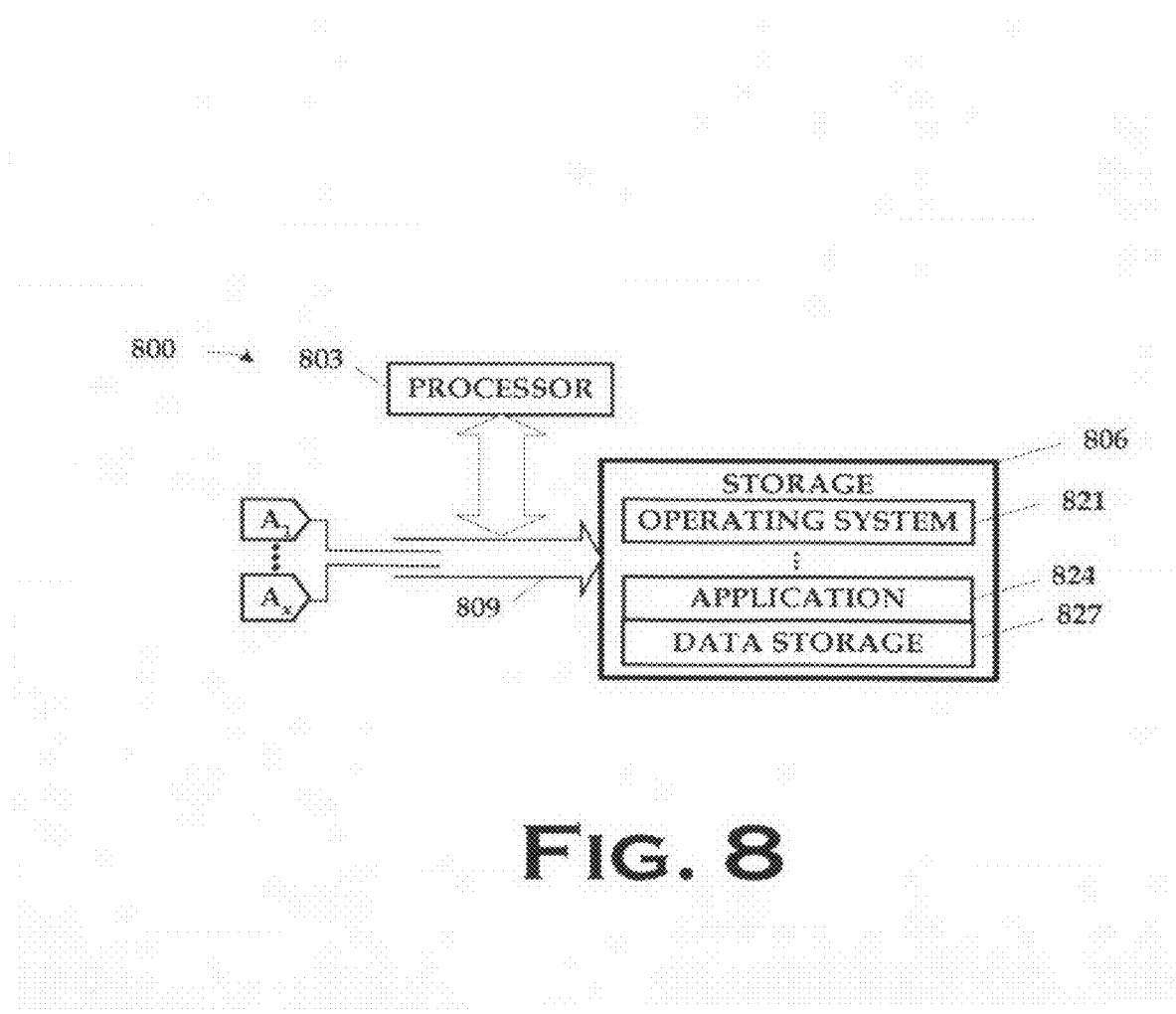
FIG. 8 depicts, in a block diagram, selected portions of the electronics of the implementation of FIG. 3.

As those in the art having the benefit of this disclosure will appreciate, the data derived from the reflected return signals 717 through the channels 703-704 in FIG. 7A are buffered, and perhaps stored, for processing in a manner such as that described immediately above. FIG. 8 depicts, in a conceptualized block diagram, selected portions of the electronics 800 with which certain aspects of the present invention may be implemented. The electronics 800 include a processor 803 communicating with some storage 806 over a bus system 809. In general, the electronics 800 will handle lots of data in relatively short time frames. Thus, some kinds of processors are more desirable than others for implementing the processor 805 than others. For instance, a digital signal processor ("DSP") may be more desirable for the illustrated embodiment than will be a general purpose microprocessor. In some embodiments, the processor 803 may be implemented as a processor set, such as a microprocessor with a math co-processor.

The storage 806 may be implemented in conventional fashion and may include a variety of types of storage, such as a hard disk and/or random access memory ("RAM") and/or removable storage such as a magnetic disk (not shown) or an optical disk (also not shown). The storage 806 will typically involve both read-only and writable memory. The storage 806 will typically be implemented in magnetic media (e.g., magnetic tape or magnetic disk), although other types of media may be employed in some embodiments (e.g., optical disk). The present invention admits wide latitude in implementation of the storage 806 in various embodiments. In the illustrated embodiment, the storage 806 is implemented in RAM and in cache.

The storage 806 is encoded with an operating system 821. The processor 803 runs under the control of the operating system 821, which may be practically any operating system known to the art. The storage 806 is also encoded with an application 842 in accordance with the present invention. The application 824 is invoked by the processor 803 under the control of the operating system 821. The application 824, when executed by the processor 803, performs the process of the invention described more fully above. The storage 806 includes a data storage 827 comprising a data structure that may be any suitable data structure known to the art.

The inputs $A_1$-$A_x$ in FIG. 8 represent the outputs of the channels 624-626 in FIG. 6 and 703-704 in FIG. 7A. The data received from the inputs $A_1$-$A_x$ is stored in the data storage 827. The application 824, when invoked, performs the methods described elsewhere associated with the operation of the platform 303 with the VAL transmitter 100 in the first and second modes. Note that this operation comprises the execution of the application, and is therefore software implemented. As those in the art having the benefit of this disclosure will appreciate, such a functionality may be implemented in hardware, software, or some combination of the two, depending on the implementation. In the illustrated embodiment, the functionality is implemented in software.

Consequently, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 9:
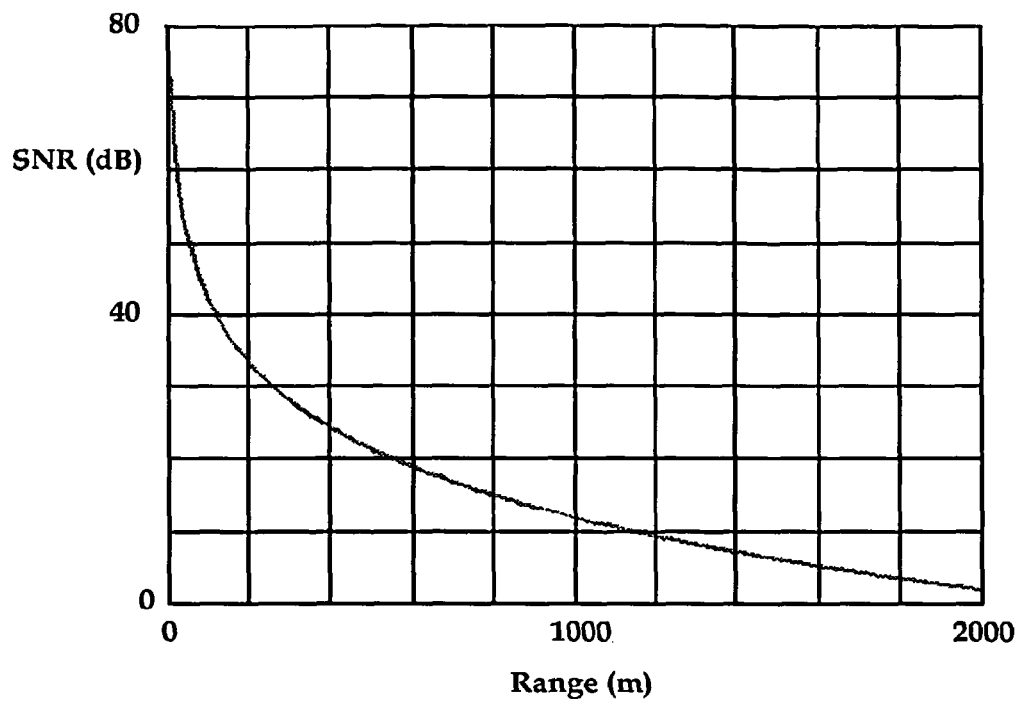
FIG. 9 illustrates power received for the first particular embodiment.
Figure 10:
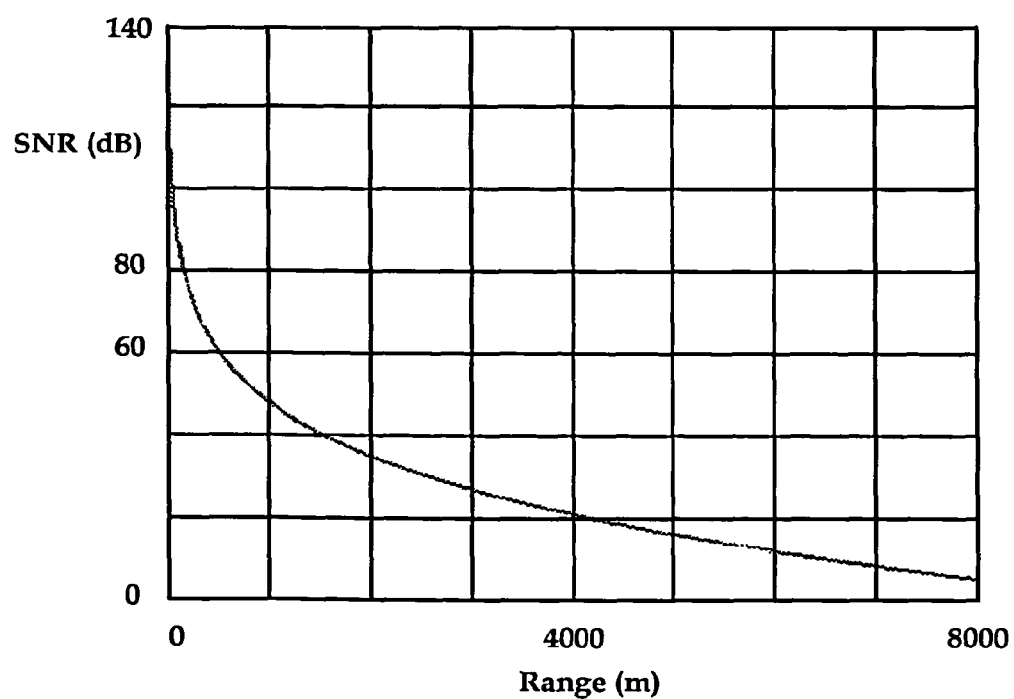
FIG. 10 illustrates power received for the second particular embodiment.

With respect to FIG. 9-FIG. 10

FIG. 9 illustrates power received for a 0.17189°, 3 mrad beamwidth, 10-Watt average source power at a fixed squint angle=0.1°; for the first non-coherent processing embodiment FIG. 10 illustrates power received for a 0.17189°, 3 mrad beamwidth, 10-Watt average source power at a fixed squint angle=0.1°; for the second coherent processing embodiment This concludes the detailed description. The particular embodiments disclosed above are illustrative only, as the invention may be modified and practiced in different but equivalent manners apparent to those skilled in the an having the benefit of the teachings herein. Furthermore, no limitations are intended to the details of construction or design herein shown, other than as described in the claims below. For example:

scanning and frequency encoding could be performed in separate steps in some embodiments, for example, by frequency encoding and then holding that encoding while scanning the mirror for example one might instead or might additionally encode with angle of transmission in elevation, e.g., encode in azimuth and elevation with crossed AOMs or a composite AOM, both of which are commercially available;

frequency encoding is not needed for the coherent processing mode if one uses two mirrors and no AOM;

the laser may be any kind of coherent laser could be used (e.g., fiber, diode, gas) that is continuous wave or even pulsed, provided that there is continuous sine wave connection from one pulse to the next (i.e., they are coherent pulse to pulse)

it is not limited to narrow beam, high gain laser signals, but can manage the beam width and can create a wider low gain beam if it needs one; and it can scan in azimuth, in elevation, or in both azimuth and elevation.

It is therefore evident that the particular embodiments disclosed above may be altered or modified and all such variations are considered within the scope and spirit of the invention. Accordingly, the protection sought herein is as set forth in the claims below.

What is claimed:

1. A method comprising:
generating a continuous wave laser signal;
frequency encoding the laser signal with the angle of transmission;
scanning the frequency encoded laser signal into a field of view;
sensing a return signal; and
imaging the sensed return signal, the image representing the content of the field of view without blind zones.

2. The method of claim 1, wherein sensing the return signal includes sensing the return signal on a single detector.

3. The method of claim 1, wherein scanning the laser signal into the field of view includes scanning the laser signal through electro-optical modulation of the laser signal.

4. The method of claim 1, wherein frequency encoding the laser signal includes frequency encoding the laser signal as it is scanned into the field of view.

5. The method of claim 4, wherein frequency encoding the laser signal includes acousto-optically modulating the laser signal.

6. The method of claim 1, wherein frequency encoding the laser signal includes acousto-optically modulating the laser signal.

7. The method of claim wherein frequency encoding the laser signal with the angle of transmission includes frequency encoding the laser signal with the angle of transmission in azimuth.

8. The method of claim 1, wherein processing the return signal includes coherently processing a laser signal.

9. The method of claim 1, wherein processing the return signal includes non-coherently processing a laser signal.

10. A laser apparatus, comprising:
a transmitter, including:
a continuous wave laser;
means for scanning a laser signal generated by the laser into a field or view
means for encoding the scanned laser signal with the angle of transmission at which it is scanned; and
a receiver, including:
a single detector from which a reflection of the scanned laser signal can be imaged with no blind zones.

11. The laser apparatus of claim 10, wherein the scanning means and the encoding means comprise an acousto-optical modulator.

12. The laser apparatus of claim 10, further comprising a beam splitter for splitting the laser signal prior to being scanned into the field of view.

13. The laser apparatus of claim 10, further comprising a plurality of electronics for processing the detected reflection.

14. The laser apparatus of claim 10, further comprising means for scanning the laser signal into the field of view in a direction orthogonal to the direction in which the acousto-optical modulator scans the laser signal.

15. The laser apparatus of claim 14, wherein the orthogonal direction scanning means comprises a galvo-mirror.

16. A method, comprising:
transmitting a laser signal linear frequency modulated over azimuth and frequency encoded with the angle of transmission;
sensing a return signal; and
processing the sensed return signal to image the field of view based upon the angle of transmission and the linear frequency modulation of the transmitted laser signal.

17. The method of claim 16, wherein transmitting the laser signal includes frequency encoding the laser signal as it is scanned into the field of view.

18. The method of claim 16, wherein sensing the return signal includes sensing the return signal on a single detector.

19. The method of claim 16, wherein processing the sensed signal includes coherent processing of the sensed signal.

20. The method of claim 16, wherein processing the sensed signal includes coherent processing of the sensed signal.

* * * * *

UNITED STATES PATENT AND TRADEMARK OFFICE
CERTIFICATE OF CORRECTION

PATENT NO. : 8,525,974 B2
APPLICATION NO. : 12/932113
DATED : September 3, 2013
INVENTOR(S) : Mark A. Turner and Brett A. Williams It is certified that error appears in the above-identified patent and that said Letters Patent is hereby corrected as shown below:

In the Claims

Column 21, Lines 4-7, in claim 7, replace:

"The method of claim wherein frequency encoding the laser signal with the angle of transmission includes frequency encoding the laser signal with the angle of transmission in azimuth." with -- "The method of claim 1, wherein frequency encoding the laser signal with the angle of transmission includes frequency encoding the laser signal with the angle of transmission in azimuth." --.

Column 21, Lines 12-21, in claim 10, replace:

"A laser apparatus, comprising: a transmitter, including: a continuous wave laser; means for scanning a laser signal generated by the laser into a field or view means for encoding the scanned laser signal with the angle of transmission at which it is scanned;" with -- "A laser apparatus, comprising: a transmitter, including: a continuous wave laser; means for scanning a laser signal generated by the laser into a field of view; means for encoding the scanned laser signal with the angle of transmission at which it is scanned;" --.

Signed and Sealed this
Thirty-first Day of December, 2013

Margaret A. Focarino
*Commissioner for Patents of the United States Patent and Trademark Office*